US012656211B2

(12) United States Patent
Naiki

(10) Patent No.: US 12,656,211 B2
(45) Date of Patent: Jun. 16, 2026

(54) METHOD OF EVALUATING NATURAL FREQUENCY OF PIEZOELECTRIC VIBRATOR, METHOD OF DRIVING TRANSDUCER, SIGNAL TRANSMITTING/RECEIVING DEVICE, AND DRIVE SYSTEM

(71) Applicant: ROHM CO., LTD., Kyoto (JP)

(72) Inventor: Takashi Naiki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 370 days.

(21) Appl. No.: 18/316,089

(22) Filed: May 11, 2023

(65) Prior Publication Data

US 2023/0408367 A1 Dec. 21, 2023

(30) Foreign Application Priority Data

May 20, 2022 (JP) ................................. 2022-082887

(51) Int. Cl.
*G01M 7/02* (2006.01)
*G02B 26/08* (2006.01)

(52) U.S. Cl.
CPC ......... *G01M 7/022* (2013.01); *G02B 26/0858* (2013.01)

(58) Field of Classification Search
None
See application file for complete search history.

(56) References Cited

U.S. PATENT DOCUMENTS

2010/0329080 A1* 12/2010 Frank .................. G01S 7/52004
                                                  367/99
2016/0037265 A1* 2/2016 Khenkin ................ H04R 19/04
                                                  381/174

FOREIGN PATENT DOCUMENTS

| CN | 104748748 A | 7/2015 |
|----|-------------|--------|
| DE | 10323062 A1 | 12/2004 |
| DE | 10122065 B4 | 10/2007 |
| DE | 102007059908 A1 | 6/2009 |
| DE | 102010040238 A1 | 3/2012 |
| DE | 102014007977 A1 | 12/2015 |
| EP | 2297798 B1 | 8/2016 |
| JP | 2017-022576 A | 1/2017 |

OTHER PUBLICATIONS

German Office Action dated Dec. 18, 2023, in the counterpart German Patent Application No. 10 2023 112 517.6.

* cited by examiner

*Primary Examiner* — Suman K Nath
(74) *Attorney, Agent, or Firm* — Rabin & Berdo, P.C.

(57) ABSTRACT

A method of evaluating a natural frequency of a piezoelectric vibrator including a vibrating membrane and a piezoelectric element, includes: transmitting a drive signal to the piezoelectric element for a certain period of time so as to allow the vibrating membrane to vibrate; acquiring information about a power-generating wave of the piezoelectric vibrator after stopping the transmission of the drive signal to the piezoelectric element; and determining a frequency of the drive wave at which a value of a voltage of the power-generating wave is maximum as the natural frequency of the piezoelectric vibrator, based on the information about the power-generating wave.

10 Claims, 7 Drawing Sheets

III          III 220          220

METHOD OF EVALUATING NATURAL FREQUENCY OF PIEZOELECTRIC VIBRATOR, METHOD OF DRIVING TRANSDUCER, SIGNAL TRANSMITTING/RECEIVING DEVICE, AND DRIVE SYSTEM

CROSS-REFERENCE TO RELATED APPLICATION

This application is based upon and claims the benefit of priority from Japanese Patent Application No. 2022-082887, filed on May 20, 2022, the entire contents of which are incorporated herein by reference.

TECHNICAL FIELD

The present disclosure relates to a method of evaluating a natural frequency of a piezoelectric vibrator, a method of driving a transducer, a signal transmitting/receiving device, and a drive system.

BACKGROUND

In devices such as MEMS mirrors, which includes a flat plate like a movable vibrating membrane, the flat plate is displaced in a membrane thickness direction due to a Coulomb force (electrostatic), a Lorentz force (electromagnetic), a piezoelectric stress (piezoelectric), or the like. Due to such a displacement, a stress is generated in a supporter that supports the flat plate, and a torsional force or the like is applied to the supporter due to the stress. As a result, vibration occurs in the flat plate. The tilt of the flat plate due to the vibration is most efficient when driven at a resonance frequency (natural frequency) of the flat plate.

However, the movable flat plate has structural variations in size, thickness, and the like in a manufacturing process. A spring constant of a portion that functions as a spring for moving the flat plate also varies due to the structural variations. As a result, a natural frequency, which is an optimal drive frequency of a device, varies from device to device. Thus, it is important to determine the natural frequency of each device for use of the device. Further, in a case where the drive frequency of the device is determined in advance, when the natural frequency deviates from the drive frequency, it leads to a decrease in efficiency. Moreover, it is difficult to inspect and adjust the drive frequency each time the natural frequency deviates from the drive frequency.

SUMMARY

Some embodiments of the present disclosure provide an evaluation method capable of determining a natural frequency of a piezoelectric vibrator, a method of driving a transducer by receiving a drive signal obtained by the natural frequency of the piezoelectric vibrator obtained by the evaluation method, a signal transmitting/receiving device that transmits a drive signal to the transducer and receives power-generating wave information from the transducer, and a drive system that controls the natural frequency of the piezoelectric vibrator to a specific frequency.

According to an aspect of the present embodiment, a method of evaluating a natural frequency of a piezoelectric vibrator including a vibrating membrane and a piezoelectric element, includes: transmitting a drive signal to the piezoelectric element for a certain period of time so as to allow the vibrating membrane to vibrate; acquiring information about a power-generating wave of the piezoelectric vibrator after stopping transmission of the drive signal to the piezoelectric element; and determining a frequency of the drive wave at which a value of a voltage of the power-generating wave is maximum as the natural frequency of the piezoelectric vibrator, based on the information about the power-generating wave.

According to another aspect of the present embodiment, a method of evaluating a natural frequency of a vibrator including a vibrating membrane, a shaft having a first end connected to the vibrating membrane, and a frame connected to a second end of the shaft and configured to surround the vibrating membrane while being spaced apart from the vibrating membrane, includes: vibrating the vibrating membrane; acquiring current information by an electromagnetic induction from a wiring arranged on the vibrating membrane; and determining a frequency of a drive wave with a largest current value as the natural frequency of the vibrator, based on the current information.

According to another aspect of the present embodiment, a method of driving a transducer that transmits an ultrasonic wave by a vibration of a piezoelectric vibrator and vibrates the piezoelectric vibrator by receiving an ultrasonic wave, includes: driving the transducer by receiving the drive signal with the natural frequency of the piezoelectric vibrator obtained by the aforementioned method.

According to another aspect of the present embodiment, a signal transmitting/receiving device that transmits a drive signal to a transducer which transmits an ultrasonic wave by a vibration of a piezoelectric vibrator and vibrates the piezoelectric vibrator by receiving an ultrasonic wave, and receives information about a power-generating wave from the transducer, includes: a storage that receives and stores information about the natural frequency of the piezoelectric vibrator obtained by the aforementioned method; and a controller configured to transmit the drive signal by which the vibration of the piezoelectric vibrator becomes maximum to the transducer, based on the information about the natural frequency stored in the storage.

According to another aspect of the present embodiment, a drive system controls a control voltage to be applied to a piezoelectric element for control arranged on the vibrating membrane so that the natural frequency of the piezoelectric vibrator obtained by the aforementioned method becomes a specific frequency.

According to another aspect of the present embodiment, a drive system determines a voltage amplitude value of the drive wave so that an absolute value of the voltage of the power-generating wave obtained when the piezoelectric vibrator is driven by the drive wave with the natural frequency of the piezoelectric vibrator obtained by the aforementioned method does not exceed a specific value.

BRIEF DESCRIPTION OF DRAWINGS

The accompanying drawings, which are incorporated in and constitute a part of the specification, illustrate embodiments of the present disclosure.

FIG. 2 is a top view showing an example of a configuration of a transducer in the present embodiment.

FIG. 3 is a cross-sectional view taken along line III-III in FIG. 2.

3

Figure 4:
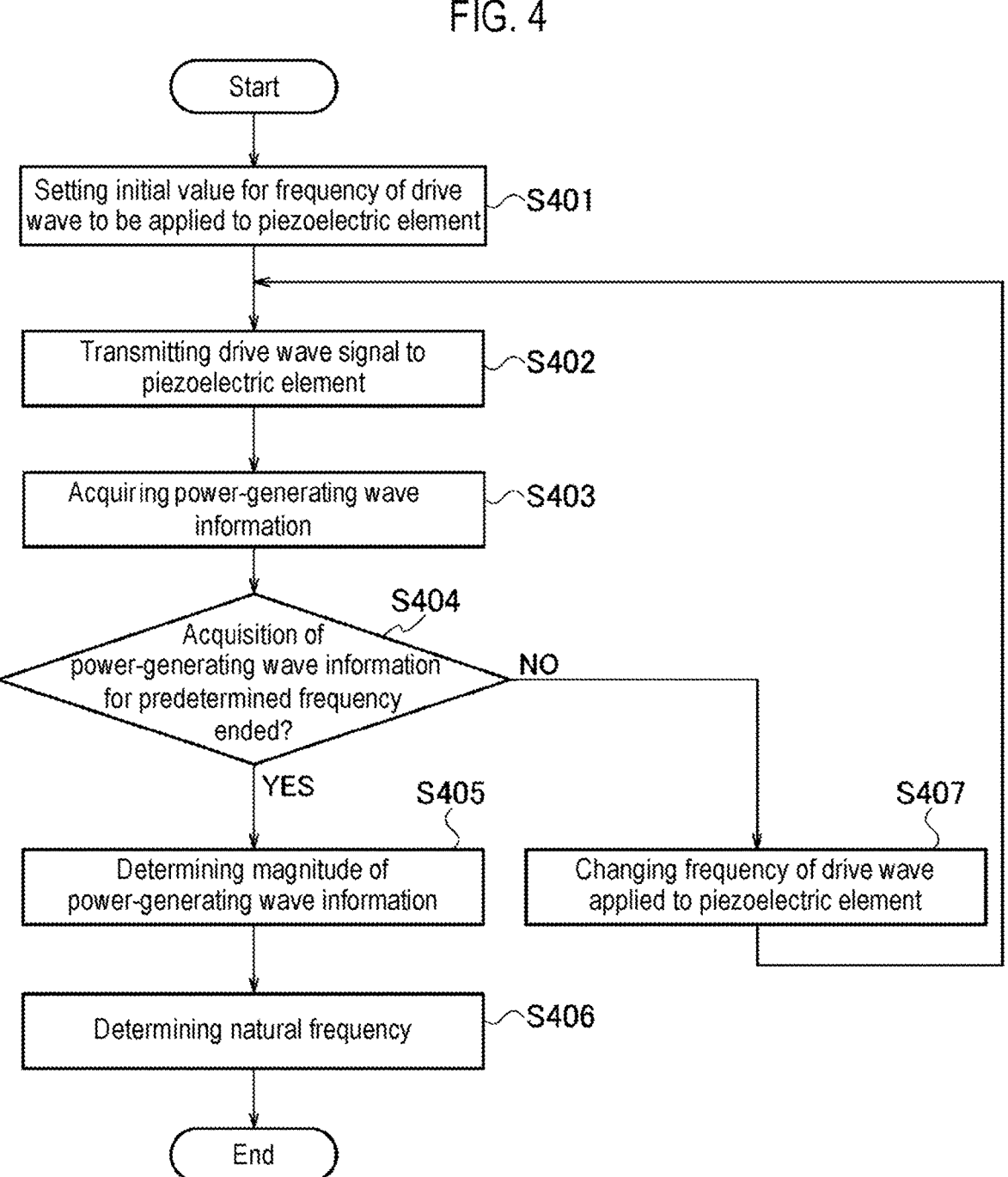

FIG. 4 is a flowchart showing an example of a process for evaluating a natural frequency of a piezoelectric vibrator in the present embodiment.

Figures 5, 6:
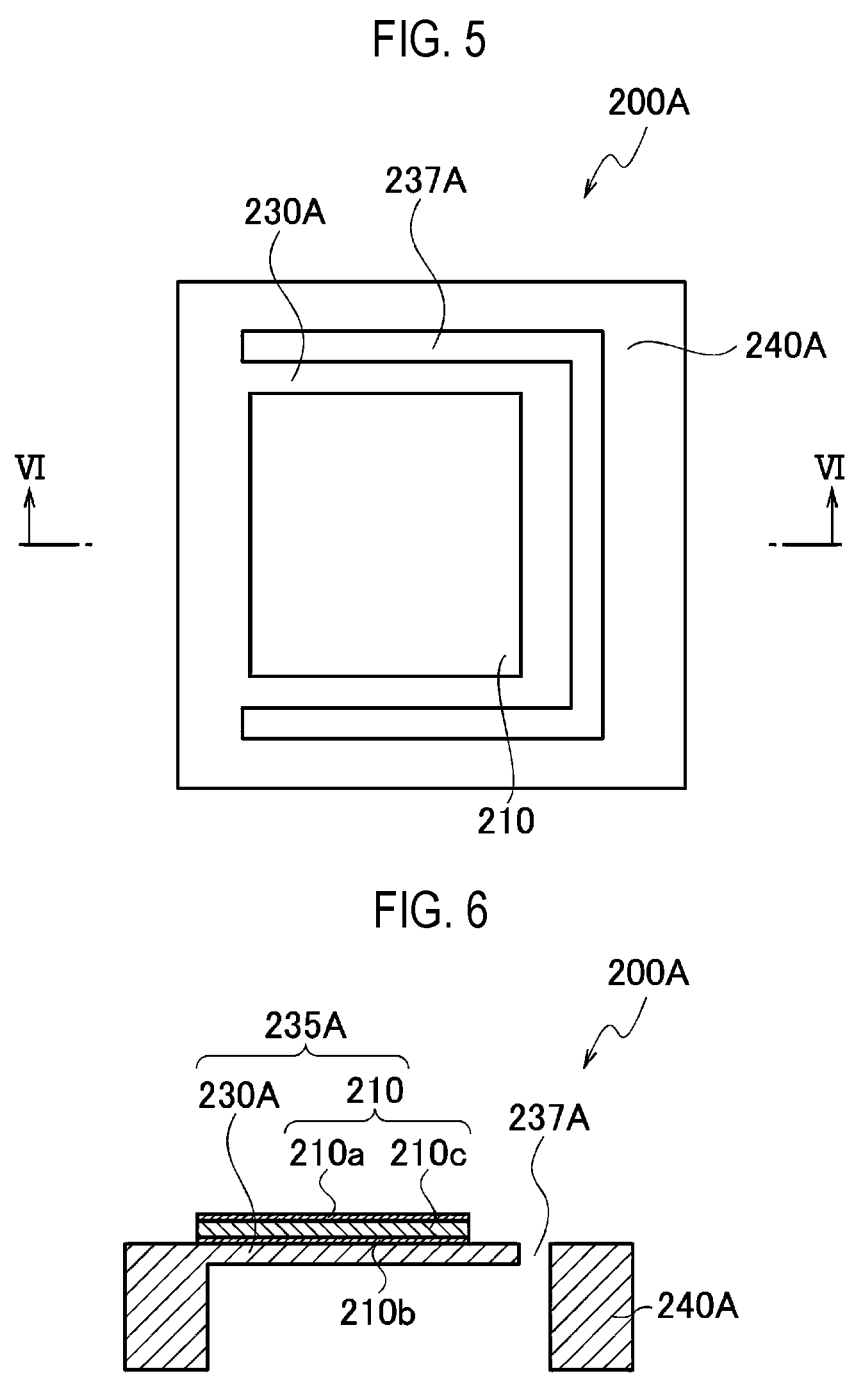

FIG. 5 is a top view showing a first modification of the transducer in the present embodiment.

FIG. 6 is a cross-sectional view taken along line VI-VI in FIG. 5.

Figure 7:
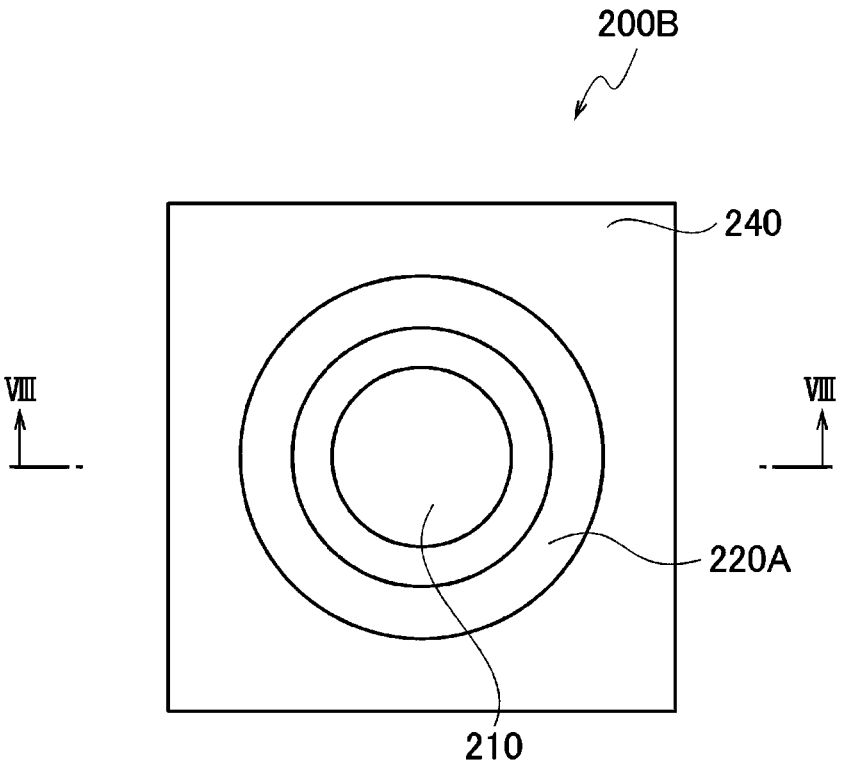

FIG. 7 is a top view showing a second modification of the transducer in the present embodiment.

Figure 8:
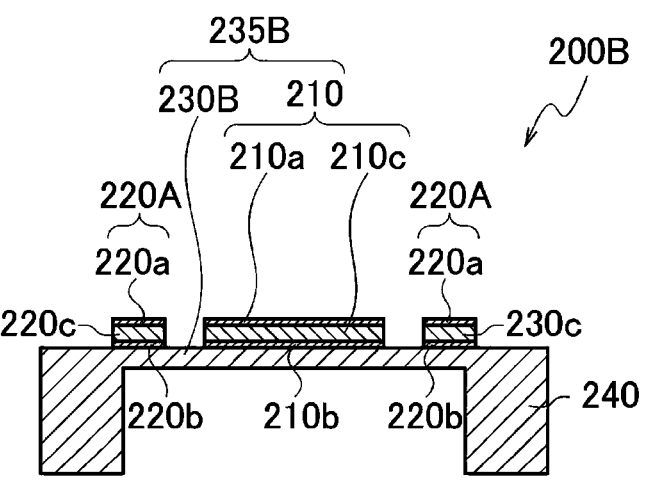

FIG. 8 is a cross-sectional view taken along line VIII-VIII in FIG. 7.

Figure 9:
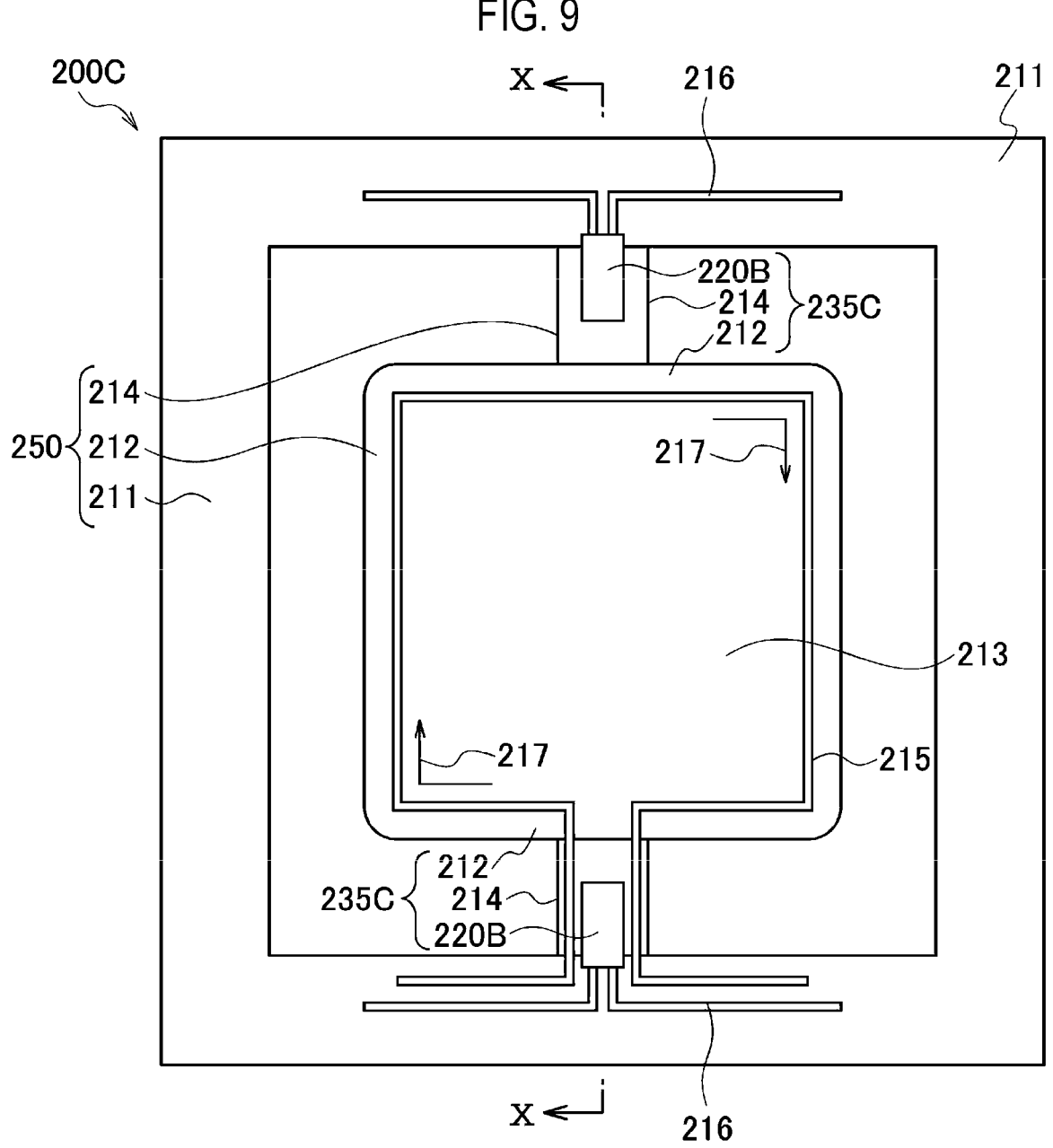

FIG. 9 is a top view showing a configuration of an MEMS mirror in the present embodiment.

Figure 10:
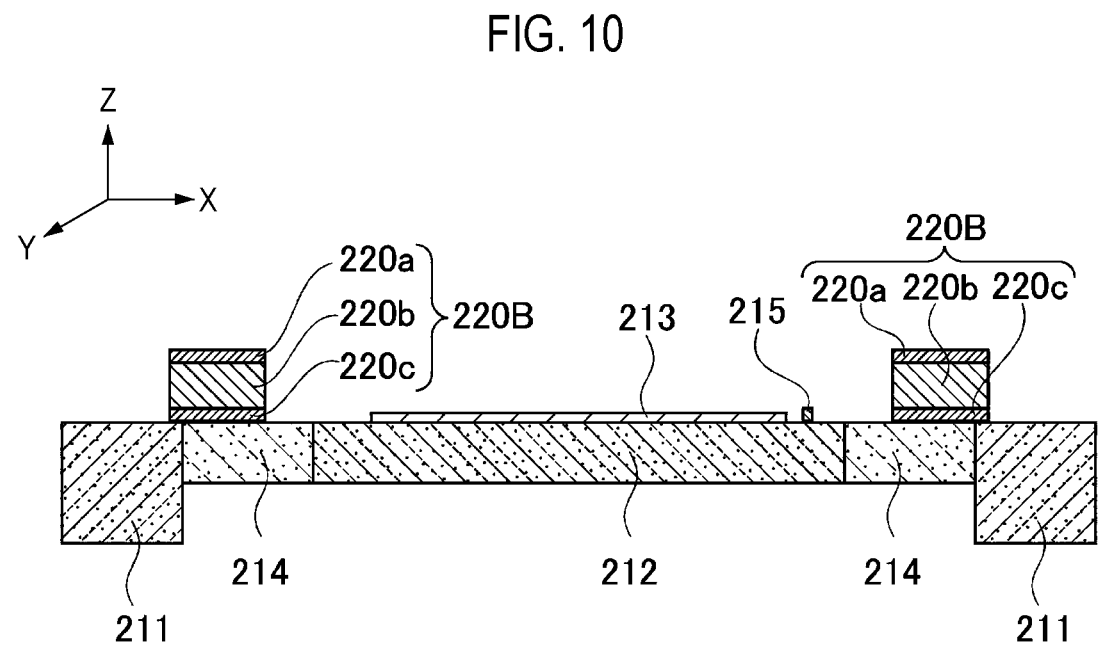

FIG. 10 is a cross-sectional view taken along line X-X in FIG. 9.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Next, the present embodiment will be described with reference to the accompanying drawings. In the following description of the drawings, the same or similar parts will be denoted by the same or similar reference numerals. However, it should be noted that the drawings are schematic and the relationship between the thickness of each component and the planar dimensions, and the like, may differ from reality. Therefore, specific thicknesses and dimensions should be determined with reference to the following description. Also, there may be a case where the relationship of dimensions and the ratios differ from each other between the drawings.

Further, the following embodiments are examples of an apparatus and method for embodying technical ideas and do not specify the material, shape, structure, arrangement, and the like of each component. Various modifications may be made to the present embodiment within the scope of the claims.

A specific aspect of the present embodiment is as follows.

<1> A method of evaluating a natural frequency of a piezoelectric vibrator including a vibrating membrane and a piezoelectric element, includes: transmitting a drive signal to the piezoelectric element for a certain period of time so as to allow the vibrating membrane to vibrate; acquiring information about a power-generating wave of the piezoelectric vibrator after stopping the transmission of the drive signal to the piezoelectric element; and determining a frequency of the drive wave at which a value of a voltage of the power-generating wave is maximum as the natural frequency of the piezoelectric vibrator, based on the information about the power-generating wave.

According to <1> above, by transmitting several drive signals to the piezoelectric element to vibrate the vibrating membrane and acquiring pieces of information about the power-generating wave of the piezoelectric vibrator with respect to the several drive signals, it is possible to specify the frequency of the drive wave with the largest voltage value of the power-generating wave and evaluate the frequency as the natural frequency of the piezoelectric vibrator with the highest vibration level (amplitude).

<2> in the method of <1> above, the transmission of the drive signal to the piezoelectric element is stopped when an absolute value of a drive voltage of the piezoelectric element becomes minimum.

According to <2> above, by stopping the transmission of the drive signal in a state in which the vibration of the piezoelectric vibrator has momentum, it is possible to evaluate in more detail the vibration level (amplitude) of the piezoelectric vibrator caused by the momentum even after stopping the transmission.

<3> In the method of <1> or <2> above, the vibrating membrane is of a membrane type.

According to <3> above, since an outer peripheral portion of the vibrating membrane is bound (fixed), it is possible to ensure a mechanical strength of the piezoelectric vibrator and efficiently drive the piezoelectric vibrator in a high-frequency region.

<4> In the method of <1> or <2> above, the vibrating membrane is of a double-end supported beam type.

According to <4> above, since both ends of the vibrating membrane are bound (fixed), it is possible to ensure the mechanical strength of the piezoelectric vibrator.

<5> In the method of <1> or <2> above, the vibrating membrane is of a cantilever type.

According to <5> above, since only one end of the vibrating membrane is bound (fixed), it is possible to easily vibrate the piezoelectric vibrator and efficiently vibrate the piezoelectric vibrator with small energy.

<6> A method of evaluating a natural frequency of a vibrator including a vibrating membrane, a shaft having a first end connected to the vibrating membrane, and a frame connected to a second end of the shaft and configured to surround the vibrating membrane while being spaced apart from the vibrating membrane, includes: vibrating the vibrating membrane; acquiring current information by an electromagnetic induction from a wiring arranged on the vibrating membrane; and determining a frequency of a drive wave with a largest current value as the natural frequency of the vibrator, based on the current information.

According to <6> above, by vibrating the vibrating membrane and acquiring information about a power-generating wave of the vibrator (MEMS mirror) with respect to the vibration, it is possible to specify a frequency of the drive wave with the largest voltage value of a power-generating wave and evaluate the frequency as the natural frequency of the vibrator with the highest vibration level (amplitude).

<7> A method of driving a transducer that transmits an ultrasonic wave by a vibration of a piezoelectric vibrator and vibrates the piezoelectric vibrator by receiving an ultrasonic wave, includes: driving the transducer by receiving a drive signal with the natural frequency of the piezoelectric vibrator obtained by the method of any one of <1> to <5> above.

According to <7> above, it is possible to efficiently drive the transducer by receiving the drive signal with the optimal natural frequency.

<8> A signal transmitting/receiving device that transmits a drive signal to a transducer that transmits an ultrasonic wave by a vibration of a piezoelectric vibrator and vibrates the piezoelectric vibrator by receiving an ultrasonic wave, and receives information about a power-generating wave from the transducer, includes: a storage that receives and stores information about the natural frequency of the piezoelectric vibrator obtained by the method of any one of <1> to <5> above; and a controller configured to transmit the drive signal by which the vibration of the piezoelectric vibrator becomes maximum to the transducer, based on the information about the natural frequency stored in the storage.

According to <8> above, it is possible to control the drive signal received by the transducer to maximize the vibration of the piezoelectric vibrator based on the information about the natural frequency stored in the storage.

<9> A drive system that controls a control voltage to be applied to a piezoelectric element for control arranged on the vibrating membrane so that the natural frequency of the piezoelectric vibrator obtained by the method of any one of <1> to <5> above becomes a specific frequency.

According to <9> above, by controlling the control voltage applied to the piezoelectric element for control, the piezoelectric element for control is deformed and the vibrating membrane is also deformed along with the deformation of the piezoelectric element for control. A spring constant of the vibrating membrane itself is changed by the deformation of the vibrating membrane. Thus, it is possible to adjust the natural frequency of the piezoelectric vibrator by adjusting the control voltage to be applied to the piezoelectric element for control.

<10> A drive system that determines a voltage amplitude value of the drive wave so that an absolute value of the voltage of the power-generating wave obtained when the piezoelectric vibrator is driven by the drive wave with the natural frequency of the piezoelectric vibrator obtained by the method of any one of <1> to <5> above does not exceed a specific value.

According to <10> above, by using the voltage amplitude value of the drive wave as feedback information, even if the piezoelectric vibrator undergoes characteristic variation due to environmental factors such as temperature, time-dependent deterioration, and the like, it is possible to control the absolute value of the voltage of the power-generating wave so as not to exceed the specific value.

<Drive System>

A configuration of a drive system according to the present embodiment will be described with reference to the drawings.

Figure 1:
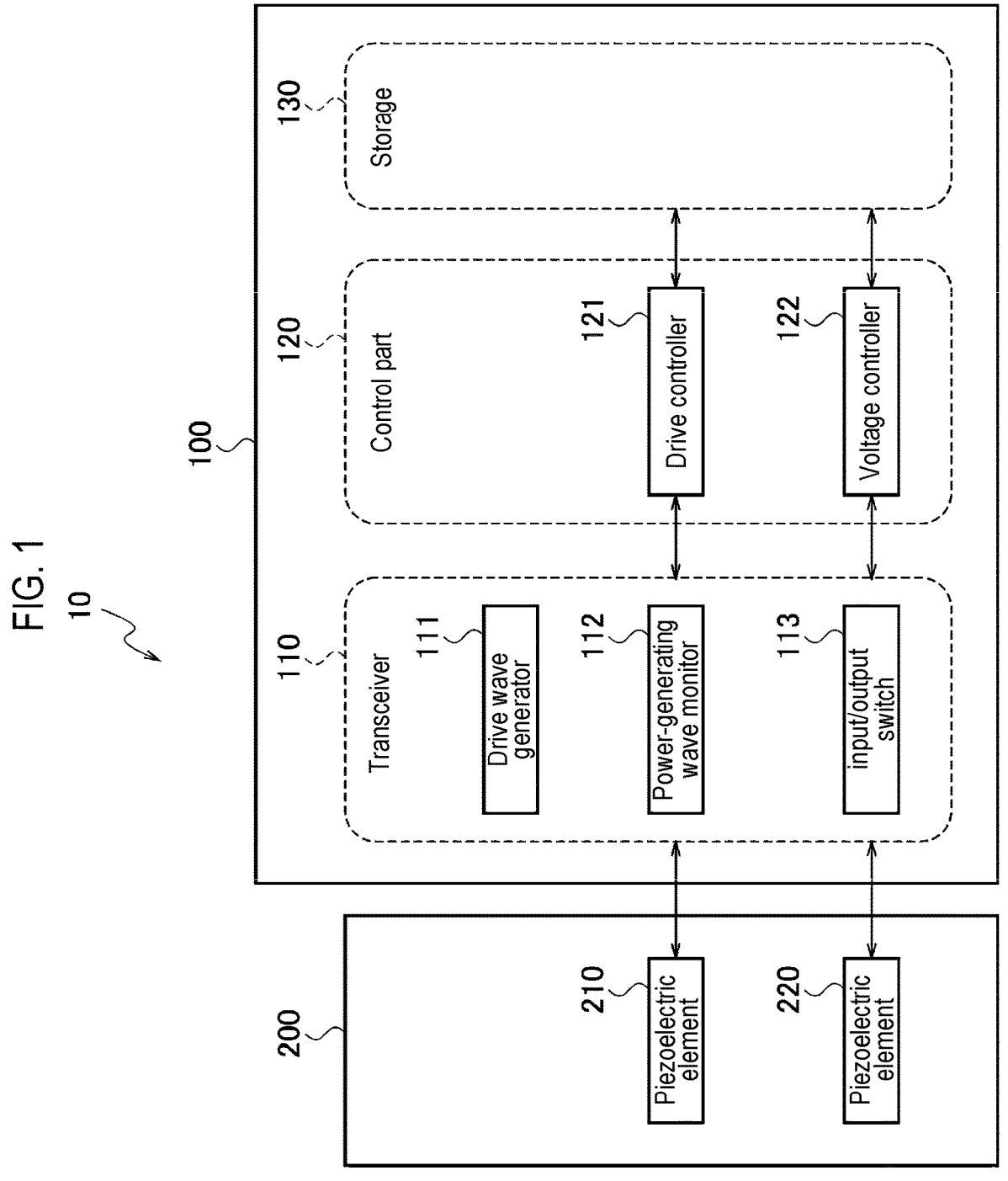
FIG. 1 is a block diagram showing a configuration of a drive system according to a present embodiment.
Figures 2, 3:
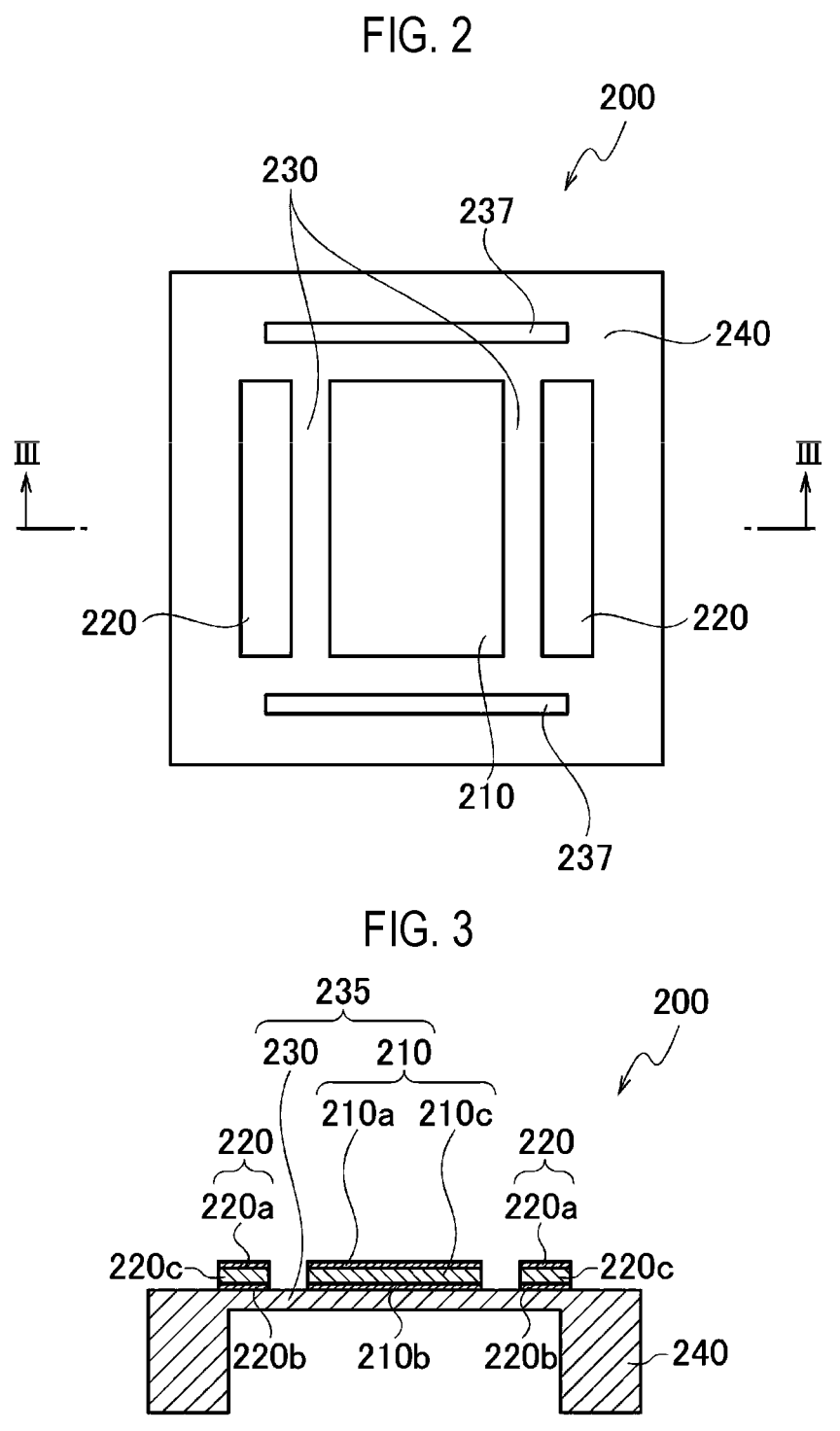

FIG. 1 is a block diagram showing the configuration of the drive system according to the present embodiment. FIG. 2 is a top view showing an example of a configuration of a transducer 200 in the present embodiment. FIG. 3 is a cross-sectional view taken along line III-III in FIG. 2. The drive system 10 is configured to include a signal transmitting/receiving device 100 and a transducer 200.

The transducer 200 is configured to include a piezoelectric element 210 that transmits an ultrasonic wave by vibration and vibrates by receiving an ultrasonic wave, a piezoelectric element 220 that controls a natural frequency of a piezoelectric vibrator 235 by applying a control voltage, a vibrating membrane 230 on which the piezoelectric element 210 and the piezoelectric element 220 are arranged, and a membrane supporter 240 to which the vibrating membrane 230 is connected. Further, a slit 237 for separating the vibrating membrane 230 is provided in the membrane supporter 240. The piezoelectric element 210 and the vibrating membrane 230 are also collectively referred to as a piezoelectric vibrator 235.

The transducer 200 functions as a sensor because it transmits an ultrasonic wave by the vibration of the piezoelectric vibrator 235 including the vibrating membrane 230 and the piezoelectric element 210 and vibrates the piezoelectric vibrator 235 by receiving an ultrasonic wave.

The transducer 200 is used for, for example, a distance measuring system capable of measuring a distance to an object by transmitting an ultrasonic wave and measuring a time TOF (Time of Flight) taken until a reflected wave returns from the object.

In the present embodiment, a direction in which the piezoelectric element 210 is positioned as viewed from the vibrating membrane 230 is referred to as an upward direction, and a direction in which the vibrating membrane 230 is positioned as viewed from the piezoelectric element 210 is referred to as a downward direction. In the following description, the upward and downward directions are defined based on the state of the transducer 200 shown in FIG. 3, but a direction in which the transducer 200 is used is not particularly limited.

A piezoelectric element undergoes characteristic variations due to a finished size such as a thickness of a piezoelectric film, crystalline characteristics of the piezoelectric film, a workmanship including minute defects, environmental factors such as temperature, time-dependent deterioration, and the like. The drive system 10 in the present embodiment makes it possible to find the natural frequency of the piezoelectric element 210 (the piezoelectric vibrator 235) that is changed due to such characteristic variations in the current environment and state, or find a condition for obtaining a predetermined natural frequency of the piezoelectric element 210. The condition for obtaining the predetermined natural frequency corresponds to, for example, adjusting a control voltage.

When transmitting the ultrasonic wave, the transducer 200 applies a drive voltage of a drive signal to the piezoelectric element 210 to vibrate the piezoelectric element 210, so that the vibrating membrane 230 in contact with the piezoelectric element 210 vibrates to generate a transmitting ultrasonic wave. In other words, the transmitting ultrasonic wave is generated as the piezoelectric vibrator 235 vibrates. Further, when receiving an ultrasonic wave, based on the vibration of the piezoelectric vibrator 235, the transducer 200 detects the reception of a receiving ultrasonic wave of a predetermined frequency by sensing an electric signal generated by the vibration.

The piezoelectric element 210 includes an upper electrode 210a, a lower electrode 210b, and a piezoelectric film 210c. That is, the piezoelectric element 210 is configured in a stacked form in which the piezoelectric film 210c is sandwiched between the upper electrode 210a and the lower electrode 210b from above and below. It is assumed that the vibrating membrane 230 is in contact with the lower electrode 210b. That is, in the present embodiment, the piezoelectric element 210 is constructed by stacking the vibrating membrane 230, the lower electrode 210b, the piezoelectric film 210c, and the upper electrode 210a in order from below.

The upper electrode 210a and the lower electrode 210b are formed using a conductive thin film made of metal such as platinum, molybdenum, iridium, or titanium. As described above, the upper electrode 210a is positioned above the piezoelectric film 210c and is connected to an electrode pad (not shown) which is a circuit pattern for applying a drive voltage to the upper electrode 210a. Similarly, the lower electrode 210b is positioned below the piezoelectric film 210c and is electrically connected via a wiring to an electrode pad (not shown) which is a circuit pattern for applying a drive voltage to the lower electrode 210b.

In this specification and the like, the expression "electrically connected" includes a case of being connected via "things having some electrical action." Here, the expression "things having some electrical action" are not particularly limited as long as they enable transmission and reception of an electrical signal between connection objects. For example, the expression "things having some electrical action" includes electrodes, wirings, switching elements, resistive elements, inductors, capacitive elements, and other elements having other various functions.

The piezoelectric film 210c is made of, for example, lead zirconate titanate (PZT). The piezoelectric film 210c may be made of aluminum nitride (AlN), zinc oxide (ZnO), lead titanate ($PbTiO_3$), or the like, in addition to the lead zirconate titanate.

The vibrating membrane 230 is composed of a thin film and is of a double-end supported beam type with its both ends bound (fixed) to the membrane supporter 240. Since the both ends of the vibrating membrane 230 are bound (fixed), a mechanical strength of the piezoelectric vibrator 235 can be ensured. Further, the vibrating membrane 230 is configured to be displaceable in a film thickness direction, that is, in a direction normal to the vibrating membrane 230. The membrane supporter 240 has a hollow portion (cavity), and the vibrating membrane 230 is connected to an inner peripheral surface of the hollow portion. The vibrating membrane 230 is connected to an upper end side of the membrane supporter 240. The vibrating membrane 230 and the membrane supporter 240 are made of, for example, silicon.

When transmitting an ultrasonic wave, the drive voltage of the drive signal sent from the signal transmitting/receiving device 100 is applied to the upper electrode 210a and the lower electrode 210b. The piezoelectric element 210 (the piezoelectric vibrator 235) vibrates according to the drive voltage of the drive signal sent to the upper electrode 210a and the lower electrode 210b to generate a transmitting ultrasonic wave.

When receiving an ultrasonic wave, the vibrating membrane 230 (the piezoelectric vibrator 235) vibrates when the ultrasonic wave of a predetermined frequency reaches the vibrating membrane 230. Due to the vibration of the vibrating membrane 230, a potential difference is generated between the upper electrode 210a and the lower electrode 210b of the piezoelectric element 210, thereby generating a predetermined voltage. The transducer 200 can receive the ultrasonic wave by detecting the generated voltage. The generated voltage is sent to the signal transmitting/receiving device 100 via the electrode pads of the piezoelectric element 210.

In the present embodiment, a signal (electrical signal) is generated between the electrodes by a positive piezoelectric effect when receiving the ultrasonic wave, and the signal transmitting/receiving device 100 extracts the signal. That is, the electrodes are used as vibration sensors for sensing the electrical signal. In general, a reception frequency with the highest sensitivity in a vibration sensor is the natural frequency of the piezoelectric vibrator 235 serving as a sensing device. By evaluating and adjusting the natural frequency of the piezoelectric vibrator 235 itself, the drive system 10 can be most sensitive and more comfortable with respect to external inputs.

The transducer 200 also includes a piezoelectric element 220 for control, which is capable of adjusting a transmission frequency of the ultrasonic wave transmitted from the piezoelectric element 210 and a reception frequency of a receivable ultrasonic wave.

By applying a predetermined control voltage, which is sent from the signal transmitting/receiving device 100, to the piezoelectric element 220, the piezoelectric element 220 deforms the vibrating membrane 230 and adjusts the transmission frequency of the transmitting ultrasonic wave and the reception frequency of the receiving ultrasonic wave. As shown in FIG. 3, like the piezoelectric element 210, the piezoelectric element 220 is constructed by stacking the vibrating membrane 230, a lower electrode 220b, a piezoelectric film 220c, and an upper electrode 220a in order from below.

When a voltage is applied between the upper electrode 220a and the lower electrode 220b, the piezoelectric film 220c contracts in a direction (horizontal direction) perpendicular to the film thickness direction (the upward direction) (and at the same time expands slightly in the film thickness direction). Therefore, the vibrating membrane 230, which does not contract in the direction perpendicular to the film thickness direction (the upward direction), and a portion stacked with the vibrating membrane 230 warp upward to deform the vibrating membrane 230 and the like. At this time, a spring constant of the warped portion changes (hardens), and as a result, the vibrating membrane 230 is pulled, and the tension of the vibrating membrane 230 also changes (increases). As a result, mechanical properties such as the spring constant and tension of the vibrating membrane 230 can be changed. As the control voltage increases in this way, the natural frequency of the piezoelectric vibrator 235 including the vibrating membrane 230 can be changed by utilizing the property that the natural frequency of the vibrating membrane 230 is high (there is a region of high natural frequency).

For the control voltage, for example, 0 V or a certain fixed voltage, a sine wave of 0 to 5 V, and the like may be used. Further, for a voltage applied to the piezoelectric element 220 for control, a voltage modulated by a filter or the like may be used. For example, the voltage applied to the upper electrode 220a may be modulated, and the voltage thus modulated may be applied to the lower electrode 220b. By doing so, the number of electrode pads and the type of drive voltage to be applied can be reduced, which makes a manufacturing process simpler.

In the above configuration, the piezoelectric element 210 is a piezoelectric element for driving (receiving) the ultrasonic vibration, and the piezoelectric element 220 is a piezoelectric element for controlling the natural frequency. However, the present disclosure is not limited thereto. By applying a predetermined control voltage, which is sent from the signal transmitting/receiving device 100, to the piezoelectric element 210, the piezoelectric element 210 may deform the vibrating membrane 230 to adjust the transmission frequency of the transmitting ultrasonic wave and the reception frequency of the receiving ultrasonic wave, and the vibrating membrane 230 may be vibrated by applying a voltage, which is sent from the signal transmitting/receiving device 100, to the piezoelectric element 220. Alternatively, a received waveform of the ultrasonic wave transmitted from the piezoelectric element 220 at the time of reception may be sent to the signal transmitting/receiving device 100. In this case, the piezoelectric element 210 (the piezoelectric vibrator 235) allows a stress to be generated in the piezoelectric film 210c according to the control voltage, and the vibrating membrane 230 also deforms according to the stress. As a result, the spring constant and the like of the vibrating membrane 230 change, so that the natural frequency of the piezoelectric vibrator provided with the piezoelectric element 220 for transmitting/receiving the ultrasonic wave and the vibrating membrane 230 can be changed.

Next, the signal transmitting/receiving device 100 will be described. The signal transmitting/receiving device 100 includes a transceiver 110, a control part 120, and a storage 130.

The transceiver 110 is configured to include a drive wave generator 111, a power-generating wave monitor 112, and an input/output switch 113. The drive wave generator 111 generates a drive wave to be transmitted to the piezoelectric element 210. The power-generating wave monitor 112 acquires information about a power-generating wave of the piezoelectric vibrator 235 including the piezoelectric element 210. The input/output switch 113 controls starting or stopping of the transmission of the drive signal to the piezoelectric element 210. When stopping the transmission of the drive signal, the power-generating wave monitor 112 may acquire the information about the power-generating wave of the piezoelectric vibrator 235.

The control part 120 includes a drive controller 121 and a voltage controller 122. The drive controller 121 controls the generation of the drive wave by the drive wave generator 111, the acquisition of the information about the power-generating wave of the piezoelectric vibrator 235 by the power generating wave monitor 112, the transmission of the drive signal to the piezoelectric element 210 by the input/output switch 113, the storage of the information about the power-generating wave of the piezoelectric vibrator 235 by the storage 130, and the like. The voltage controller 122 applies the predetermined control voltage to the piezoelectric element 220 for control.

Further, the signal transmitting/receiving device 100 may be configured as a general-purpose microcomputer including an input/output part (the transceiver 110), a central processing unit (CPU; the control part 120), a memory (the storage 130), and the like. In this case, a computer program for functioning as the signal transmitting/receiving device 100 may be installed in the microcomputer. By executing the computer program, the microcomputer functions as a plurality of information processing circuits provided in the signal transmitting/receiving device 100. Alternatively, the plurality of information processing circuits may be configured by preparing dedicated hardware for executing various types of information processing to be described later. Further, the plurality of information processing circuits may be configured by individual hardware.

The storage 130 is composed of a ROM (Read Only Memory), a RAM (Random Access Memory), a hard disk, and the like. After stopping the transmission of the drive signal to the piezoelectric element 210, the storage 130 stores, as data, information such as the information about the power-generating wave of the piezoelectric vibrator 235, which is generated with the vibration of the piezoelectric vibrator 235. The storage storing the data may be constituted with areas which are classified from each other in a physical or logical configuration in one storage device. Alternatively, a storage for each data may be provided in a plurality of physically different storage devices.

(Outline of Processing Flow of Drive System 10)

Next, a processing flow of in the drive system 10 (a method of evaluating the natural frequency of the piezoelectric vibrator) will be described using a flowchart shown in FIG. 4. A series of operations of the drive system 10 shown in the flowchart of FIG. 4 is started when the drive system 10 is powered on, and the processing is ended when the natural frequency of the piezoelectric vibrator is determined. In addition, in the flowchart shown in FIG. 4, the processing is ended by power-off or an interruption of processing end.

In step S401, the drive controller 121 sets an initial value for the frequency of the drive wave to be applied to the piezoelectric element 210. Here, the initial value for the frequency of the drive wave is set to 40 kHz which is, for example, a specification value of the device.

In step S402, the drive controller 121 transmits the drive signal to the piezoelectric element 210. As a result, the vibrating membrane 230 (the piezoelectric vibrator 235) of the transducer 200 vibrates.

In step S403, after vibrating the vibrating membrane 230 until a vibration level (amplitude) of the vibrating membrane 230 according to the drive signal transmitted to the piezoelectric element 210 becomes maximum, the input/output switch 113 stops the transmission of the drive signal to the piezoelectric element 210. After that, the power-generating wave monitor 112 detects the vibration level (amplitude) of the piezoelectric vibrator 235 to acquire the information about the power-generating wave of the piezoelectric vibrator 235. The acquired information about the power-generating wave of the piezoelectric vibrator 235 is stored as data in the storage 130. The transmission of the drive signal to the piezoelectric element 210 is stopped when the absolute value of the drive voltage of the piezoelectric element 210 becomes minimum (for example, when a minimum drive voltage value is 0V). This is preferable because after the vibration of the piezoelectric vibrator 235 has momentum, the vibration level (amplitude) of the piezoelectric vibrator 235 can be evaluated in more detail by the power-generating wave monitor 112.

Further, the vibration level (amplitude) of the piezoelectric vibrator 235 may be stored in the storage 130, as a voltage amplitude value of the drive wave. The stored voltage amplitude value may be used as feedback information to determine the voltage amplitude value of the drive wave so that the absolute value of the voltage of the power-generating wave obtained when the piezoelectric vibrator 235 is driven with the drive wave of the natural frequency does not exceed a specific value. This makes it possible to control the absolute value of the voltage of the-generating wave so as not to exceed the specific value even if the piezoelectric vibrator 235 undergoes characteristic variations due to environmental factors such as temperature, time-dependent deterioration, and the like.

In step S404, the control part 120 determines whether or not the acquisition of the information about the power-generating wave of the piezoelectric vibrator 235 with respect to a predetermined frequency has ended. Here, the predetermined frequency is a frequency set in advance as an inspection target (sensing target) in the inspection (sensing) of the natural frequency.

In step S404, when the control part 120 determines that the acquisition of the information about the power-generating wave of the piezoelectric vibrator 235 with respect to the predetermined frequency has ended (YES in step S404), the processing proceeds to step S405. On the other hand, in step S404, when the control part 120 determines that the acquisition of the information about the power-generating wave of the piezoelectric vibrator 235 with respect to the predetermined frequency has not ended (NO in step S404), the processing proceeds to step S407.

In step S405, based on the information about the power-generating wave of the piezoelectric vibrator 235 stored in the storage 130, the control part 120 determines a frequency of the drive wave with the largest voltage value of the power-generating wave.

In step S406, the control part 120 determines (evaluates) the frequency of the drive wave with the largest voltage value of the power-generating wave, as the natural frequency of the piezoelectric vibrator 235.

In step S407, the drive controller 121 changes the frequency of the drive wave to be applied to the piezoelectric element 210. Specifically, the drive controller 121 changes the frequency of the drive wave based on predetermined inspection details. In the present embodiment, the drive controller 121 changes the frequency of the drive wave by 1 kHz. That is, in step S407, the drive controller 121 changes a value of the frequency of the drive wave by 1 kHz. After that, the processing returns to step S402.

In the present embodiment, a plurality of predetermined frequencies are set, and plural kinds of pieces of information about the power-generating wave information of the piezoelectric vibrator 235 with respect to these frequencies are acquired. In order to determine the frequency of the drive wave with the largest voltage value of the power-generating wave based on the plural kinds of pieces of information about the power-generating wave, the processing proceeds to step S407 at least once to acquire the information about the power-generating wave of the piezoelectric vibrator 235 necessary for the determination. Specifically, for example, when the specification value of the device is 40 kHz, 40 kHz is set first. Subsequently, the drive controller 121 increases the frequency of the drive wave by 1 kHz. In the determination above, if the voltage value of the power-generating wave begins to drop beyond the peak, the frequency of the drive wave may be reversed in smaller frequency steps (for example, decreased by 0.5 kHz). Further, thereafter, when the peak is exceeded, the processing of reversing the frequency of the drive wave in smaller frequency steps is repeatedly performed, whereby the natural frequency of the piezoelectric vibrator 235 can be evaluated more accurately.

In addition, in the case in which the plural kinds of pieces of information about the power-generating wave are already stored in the storage 130, the natural frequency of the piezoelectric vibrator 235 may be evaluated without proceeding to step S407 even once.

According to the above-described processing flow of the drive system 10, by transmitting several drive signals to the piezoelectric element 210 to vibrate the vibrating membrane 230 and acquiring the pieces of information about the power-generating wave of the piezoelectric vibrator 235 with respect to the several drive signals, it is possible to specify the frequency of the drive wave with the largest voltage value of the power-generating wave and evaluate the frequency as the natural frequency of the piezoelectric vibrator with the highest vibration level (amplitude).

(Drive of Transducer 200)

As described above, based on the determined natural frequency of the piezoelectric vibrator 235, the drive controller 121 receives the drive signal from which the natural frequency is obtained, and transmits the drive signal to the piezoelectric element 210. As a result, the vibrating membrane 230 (the piezoelectric vibrator 235) vibrates, and the transducer 200 is driven. Since the drive signal provides the optimal natural frequency of the piezoelectric vibrator 235, the piezoelectric element 210 can drive the transducer 200 efficiently by receiving the drive signal.

(Adjustment of Natural Frequency)

The voltage controller 122 may control the value of the control voltage to be applied to the piezoelectric element

220 for control to adjust the natural frequency of the piezoelectric vibrator 235. Specifically, similarly to the above-described flowchart, the power-generating wave monitor 112 acquires the information about the power-generating wave of the piezoelectric vibrator 235 which changes according to the control voltage applied to the piezoelectric element 220, and the acquired information about the power-generating wave of the piezoelectric vibrator 235 is stored as data in the storage 130. The voltage controller 122 determines the value of the control voltage when the voltage value of the power-generating wave is the largest, based on the information about the power-generating wave of the piezoelectric vibrator 235 stored in the storage 130. The control part 120 applies to the piezoelectric element 220 the value of the control voltage when the voltage value of the power-generating wave is the largest. As a result, it is possible to adjust the natural frequency of the piezoelectric vibrator 235 to an optimal state.

In the present embodiment, the transducer 200 in which the vibrating membrane 230 is of a double-end supported beam type is used, but the present disclosure is not limited thereto. Natural frequencies of other devices as shown in the following modifications may be evaluated.

First Modification

A configuration of a transducer 200A in a first modification will be described with reference to FIGS. 5 and 6. FIG. 5 is a top view showing an example of the configuration of the transducer 200A in this modification. FIG. 6 is a cross-sectional view taken along line VI-VI in FIG. 5. The transducer 200A is configured to include a piezoelectric element 210 that transmits an ultrasonic wave by vibration and vibrates by receiving an ultrasonic wave, a vibrating membrane 230A on which the piezoelectric element 210 is arranged, and a membrane supporter 240A to which one end of the vibrating membrane 230A is connected. Further, a slit 237A for separating the vibrating membrane 230A is provided in the membrane supporter 240A. The piezoelectric element 210 and the vibrating membrane 230A are collectively referred to as a piezoelectric vibrator 235A. The transducer 200A in this modification is different from the above-described transducer 200 shown in FIGS. 2 and 3 in that the vibrating membrane 230A and the membrane supporter 240A are provided instead of the vibrating membrane 230 and the membrane supporter 240 and one end of the piezoelectric element 210 is arranged on the membrane supporter 240A. In this modification, the above description is used for common points with the transducer 200 shown in FIGS. 2 and 3, and different points will be described below.

The vibrating membrane 230A is composed of a thin film and is of a cantilever type with its one end bound (fixed) to the membrane supporter 240A due to the existence of the slit 237A. Since only one end of the vibrating membrane 230A is bound (fixed), the piezoelectric vibrator 235A easily vibrates and can be vibrated efficiently with small energy.

The above-described membrane supporter 240 may be used for the description of the membrane supporter 240A.

Even when the drive system 10 includes the transducer 200A, as described above, by transmitting several drive signals to the piezoelectric element 210 to vibrate the vibrating membrane 230A and acquiring pieces of information about the power-generating wave of the piezoelectric vibrator 235A with respect to the several drive signals, it is possible to specify a frequency of the drive wave with the largest voltage value of the power-generating wave and evaluate the frequency as the natural frequency of the piezoelectric vibrator 235A with the highest vibration level (amplitude).

Further, as described above, based on the determined natural frequency of the piezoelectric vibrator 235A, the drive controller 121 receives the drive signal from which the natural frequency is obtained, and transmits the drive signal to the piezoelectric element 210. As a result, the vibrating membrane 230A (the piezoelectric vibrator 235A) vibrates, and the transducer 200A is driven. Since the drive signal provides the optimal natural frequency of the piezoelectric vibrator 235A, the piezoelectric element 210 can drive the transducer 200A efficiently by receiving the drive signal.

Second Modification

A configuration of a transducer 200B in a second modification will be described with reference to FIGS. 7 and 8. FIG. 7 is a top view showing an example of the configuration of the transducer 200B in this modification. FIG. 8 is a cross-sectional view taken along line VIII-VIII in FIG. 7. The transducer 200B is configured to include a piezoelectric element 210 that transmits an ultrasonic wave by vibration and vibrates by receiving an ultrasonic wave, a piezoelectric element 220A that controls a natural frequency of a piezoelectric vibrator 235B by applying a control voltage, a vibrating membrane 230B on which the piezoelectric element 210 is arranged, and a membrane supporter 240 to which the vibrating membrane 230B is connected. The piezoelectric element 210 and the vibrating membrane 230B are collectively referred to as a piezoelectric vibrator 235B. The transducer 200B in this modification is different from the above-described transducer 200 shown in FIGS. 2 and 3 in that the piezoelectric element 220A and the vibrating membrane 230B are provided instead of the piezoelectric element 220 and the vibrating membrane 230. In this modification, the above description is used for common points with the transducer 200 shown in FIGS. 2 and 3, and different points will be described below.

The vibrating membrane 230B is composed of a thin film and is of a membrane type in which an outer peripheral portion of the vibrating membrane 230B is bound (fixed) to the membrane supporter 240. Since the outer peripheral portion of the vibrating membrane 230B is bound (fixed), a mechanical strength of the piezoelectric vibrator 235B can be ensured, and the piezoelectric vibrator 235B can be efficiently driven in a high-frequency region.

The above-described piezoelectric element 220 may be used for the description of the piezoelectric element 220A. Further, the piezoelectric element 220A is provided so as to surround the piezoelectric element 210.

Even when the drive system 10 includes the transducer 200B, as described above, by transmitting several drive signals to the piezoelectric element 210 to vibrate the vibrating membrane 230B and acquiring pieces of information about the power-generating wave of the piezoelectric vibrator 235B with respect to the several drive signals, it is possible to specify a frequency of the drive wave with the largest voltage value of the power-generating wave and evaluate the frequency as the natural frequency of the piezoelectric vibrator with the highest vibration level (amplitude).

Further, as described above, based on the determined natural frequency of the piezoelectric vibrator 235B, the drive controller 121 receives the drive signal from which the natural frequency is obtained, and transmits the drive signal to the piezoelectric element 210. As a result, the vibrating membrane 230B (the piezoelectric vibrator 235B) vibrates, and the transducer 200B is driven. Since the drive signal provides the optimal natural frequency of the piezoelectric vibrator 235B, the piezoelectric element 210 can drive the transducer 200B efficiently by receiving the drive signal.

Further, as described above, the voltage controller 122 may control the value of the control voltage to be applied to the piezoelectric element 220 for control to adjust the natural frequency of the piezoelectric vibrator 235B.

Further, as described above, the piezoelectric element 210 may be a piezoelectric element for control, and the piezoelectric element 220A may be a piezoelectric element for vibration.

Third Modification

A configuration of an MEMS mirror 200C in a third modification will be described with reference to FIGS. 9 and 10. FIG. 9 is a top view showing an example of the configuration of the MEMS mirror 200C in this modification. FIG. 10 is a cross-sectional view taken along line X-X in FIG. 9. The MEMS mirror 200C includes a vibrating membrane 212 configured to be displaceable in a film thickness direction, a frame 211 spaced apart from the vibrating membrane 212 to surround the vibrating membrane 212, a shaft 214 that connects the vibrating membrane 212 and the frame 211 and has a film thickness smaller than that of the frame 211, a piezoelectric element 220B for control that is arranged on the shaft 214, a wiring 216 that is electrically connected to the piezoelectric element 220B to control the piezoelectric element 220B, and a wiring 215 that is arranged on an outer edge portion of the vibrating membrane 212, on the shaft 214, and on the frame 211. Although not shown, the wiring 215 and the wiring 216 are electrically connected to the above-described control part 120. The piezoelectric element 220B is arranged on each of two shafts 214 provided so as to sandwich the vibrating membrane 212 therebetween. The vibrating membrane 212, the shaft 214, and the frame 211 are collectively referred to as a vibrator 250. The vibrating membrane 212, the shaft 214, and the piezoelectric element 220B are collectively referred to as a piezoelectric vibrator 235C.

Each of the frame 211, the vibrating membrane 212, and the shaft 214 is formed by processing a base made of, for example, silicon. That is, the frame 211, the vibrating membrane 212, and the shaft 214 are made of the same material. The frame 211, the vibrating membrane 212, and the shaft 214 may be formed integrally with each other to simplify a manufacturing process.

The shaft 214 has a double-end supported beam shape with its both ends fixed, one end being connected to the vibrating membrane 212 and the other end being connected to the frame 211. The shaft 214 is interposed between the vibrating membrane 212 and the frame 211. The shaft 214 functions as a spring that assists the movement of the vibrating membrane 212 when the vibrating membrane 212 moves. The shaft 214 functions as a supporter that adjusts a spring constant when the shaft 214 functions as the spring by its own deformation and supports the vibrating membrane 212. The shaft 214 may be formed by etching so that its film thickness becomes smaller than that of the frame 211 when processing the base.

The wiring 215 functions as a metal coil. By flowing a current through the wiring 215 arranged at the outer edge portion of the vibrating membrane 212, a Lorentz force is generated according to Fleming's rule, causing the vibrating membrane 212 to tilt. Specifically, the wiring 215 functioning as the metal coil is arranged in a direction perpendicular to a magnetic field (the direction of the magnetic force is perpendicular to a membrane thickness direction Z of the vibrating membrane 212 and a direction X parallel to a connecting plane between the vibrating membrane 212 and the shaft 214). When a current flows in a direction of an arrow 217 shown in FIG. 9, the Lorentz force is applied to the wiring 215 toward the membrane thickness direction of the vibrating membrane 212. A magnitude of the Lorentz force is proportional to strengths of the current and the magnetic field.

The vibrating membrane 212 is configured to be displaceable in the membrane thickness direction. Specifically, by making the shaft 214 function as a rotary shaft and separating the shaft 214 from the frame 211, the vibrating membrane 212 may be displaced in the membrane thickness direction by virtue of the Lorentz force.

Further, a mirror 213 is provided on the vibrating membrane 212. The mirror 213 also tilts as the vibrating membrane 212 tilts. The mirror 213 can rotate a rotation axis in a direction Y perpendicular to the direction X and the membrane thickness direction Z by adjusting the Lorentz force.

The mirror 213 is not particularly limited as long as it has a mirror surface that reflects a laser beam or the like. For example, the mirror 213 may be a metal layer, which has a reflectance of 90% or more and is formed by vapor deposition or printing.

As the wiring 215 and the wiring 216, for example, copper wires, aluminum wires, and copper-clad aluminum wires (CCAW) may be used. Further, the wiring 215 and the wiring 216 may be covered with an insulating film. The insulating film is made of, for example, enamel or resin.

Even in this modification, similarly to the above-described processing flow of the drive system 10, by acquiring current information due to electromagnetic induction from the wiring 215 used to drive the MEMS mirror 200C, it is possible to specify a frequency of the drive wave with the largest current value and evaluate this frequency as the natural frequency of the vibrator with the highest vibration level (amplitude).

Further, the piezoelectric element 220B for control is arranged on the shaft 214 which is a supporter, and the piezoelectric element 220B is deformed by applying a constant control voltage to the piezoelectric element 220B via the wiring 216. Along with the deformation of the piezoelectric element 220B, since both ends of the shaft 214 are deformed so as to pull each other, the shaft 214 becomes stiff, and the spring constant of the shaft 214 increases. By adjusting the control voltage applied to the piezoelectric element 220B, the piezoelectric element 220B is deformed, and the shaft 214 is also deformed along with such a deformation. As a result, the spring constant of the shaft 214 can be adjusted, and the natural frequency of the piezoelectric vibrator 235C can be adjusted. By adjusting the natural frequency of the piezoelectric vibrator 235C, it is possible to adjust the natural frequency of the vibrator 250 including the vibrating membrane 212, the shaft 214, and the frame 211.

The above-described piezoelectric element 220 may be used for the description of the piezoelectric element 220B.

The piezoelectric element 220B may change an optical path of the laser beam incident on the mirror surface to drive the MEMS mirror 200C at the most efficient natural frequency.

OTHER EMBODIMENTS

As noted above, one embodiment has been described, but the discussion and drawings forming a portion of the disclosure are illustrative and should not to be construed in a limited way. Various alternative embodiments, examples, and operational techniques will become apparent to those skilled in the art from this disclosure. Thus, the present embodiment includes various embodiments and the like that are not described here.

According to the present disclosure in some embodiments, it is possible to provide an evaluation method capable of determining natural frequency of a piezoelectric vibrator, a method of driving a transducer by receiving a drive signal obtained by the natural frequency of the piezoelectric vibrator obtained by the evaluation method, a signal transmitting/receiving device that transmits the drive signal to the transducer and receives information about a power-generating wave from the transducer, and a drive system that controls the natural frequency of the piezoelectric vibrator to a specific frequency.

While certain embodiments have been described, these embodiments have been presented by way of example only, and are not intended to limit the scope of the disclosures. Indeed, the embodiments described herein may be embodied in a variety of other forms. Further, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A method of evaluating a natural frequency of a piezoelectric vibrator including a vibrating membrane and a piezoelectric element, the method comprising:
   transmitting a drive signal to the piezoelectric element for a certain period of time so as to allow the vibrating membrane to vibrate;
   acquiring information about a power-generating wave of the piezoelectric vibrator after stopping the transmission of the drive signal to the piezoelectric element; and
   determining a frequency of a drive wave for the drive signal at which a value of a voltage of the power-generating wave is maximum as the natural frequency of the piezoelectric vibrator, based on the information about the power-generating wave.

2. The method of claim 1, wherein the transmitting the drive signal to the piezoelectric element is stopped when an absolute value of a drive voltage of the piezoelectric element becomes minimum.

3. The method of claim 1, wherein the vibrating membrane is of a membrane type.

4. The method of claim 1, wherein the vibrating membrane is of a double-end supported beam type.

5. The method of claim 1, wherein the vibrating membrane is of a cantilever type.

6. A method of driving a transducer that transmits an ultrasonic wave by a vibration of a piezoelectric vibrator and vibrates the piezoelectric vibrator by receiving an ultrasonic wave, the method comprising:
   driving the transducer by receiving the drive signal with the natural frequency of the piezoelectric vibrator obtained by the method of claim 1.

7. A signal transmitting/receiving device that transmits a drive signal to a transducer which transmits an ultrasonic wave by a vibration of a piezoelectric vibrator and vibrates the piezoelectric vibrator by receiving an ultrasonic wave, and receives information about a power-generating wave from the transducer, comprising:

a storage that receives and stores information about the natural frequency of the piezoelectric vibrator obtained by the method of claim 1; and a controller configured to transmit the drive signal by which the vibration of the piezoelectric vibrator becomes maximum to the transducer, based on the information about the natural frequency stored in the storage.

8. A drive system that controls a control voltage to be applied to a piezoelectric element for control arranged on the vibrating membrane so that the natural frequency of the piezoelectric vibrator obtained by the method of claim 1 becomes a specific frequency.

9. A drive system that determines a voltage amplitude value of the drive wave so that an absolute value of the voltage of the power-generating wave obtained when the piezoelectric vibrator is driven by the drive wave with the natural frequency of the piezoelectric vibrator obtained by the method of claim 1 does not exceed a specific value.

10. A method of evaluating a natural frequency of a vibrator including a vibrating membrane, a shaft having a first end connected to the vibrating membrane, and a frame connected to a second end of the shaft and configured to surround the vibrating membrane while being spaced apart from the vibrating membrane, the method comprising:

transmitting a drive signal to the vibrator to vibrate the vibrating membrane;

acquiring current information by an electromagnetic induction from a wiring arranged on the vibrating membrane after stopping the transmission of the drive signal to the vibrator; and determining a frequency of a drive wave for the drive signal with a largest current value as the natural frequency of the vibrator, based on the current information.

* * * * *